Feb. 27, 1945. D. W. BOWMAN 2,370,444
APPARATUS FOR SEPARATING SUSPENDED MATTER FROM GAS
Filed Nov. 29, 1944 3 Sheets-Sheet 1
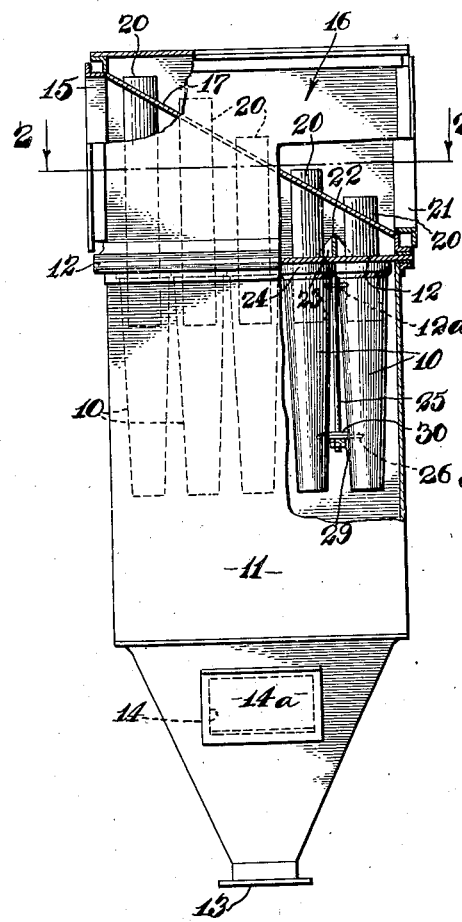
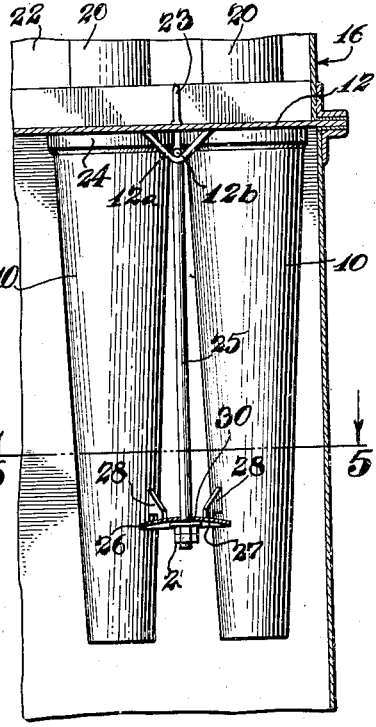
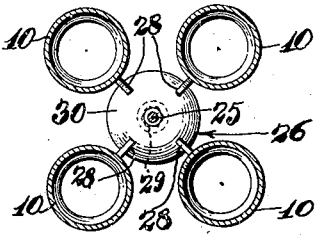
Inventor
David W. Bowman
Alfred W. Knight
By
Attorney Feb. 27, 1945. D. W. BOWMAN 2,370,444
APPARATUS FOR SEPARATING SUSPENDED MATTER FROM GAS
Filed Nov. 29, 1944 3 Sheets-Sheet 2
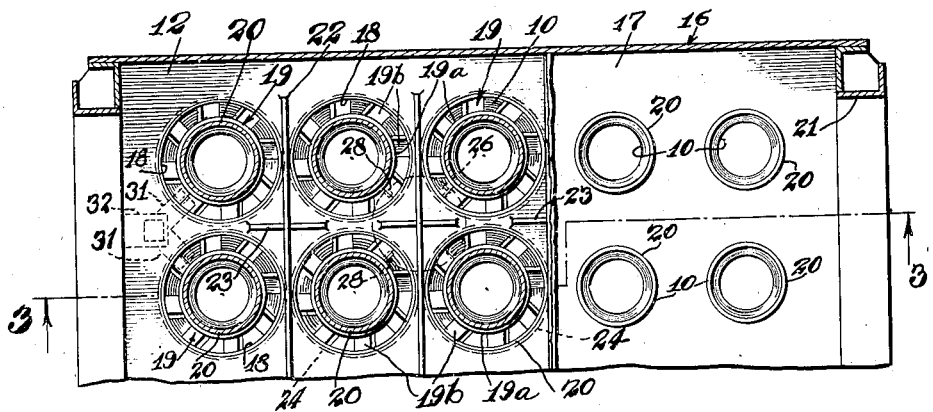
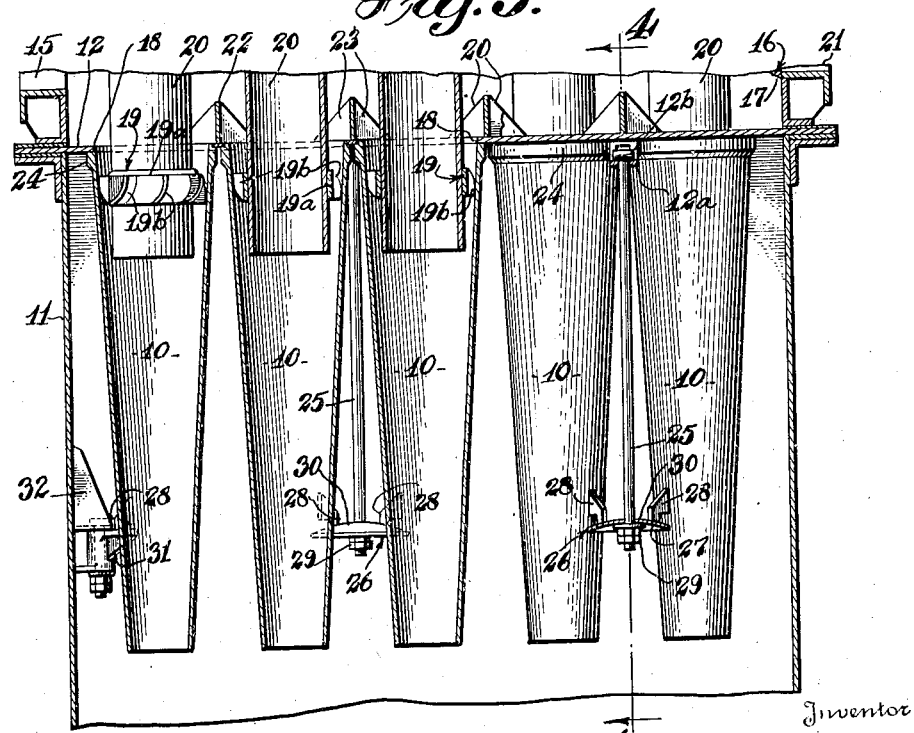
Inventor
David W. Bowman
Alfred W. Knight
By Attorney Inventor
David W. Bowman
Alfred W. Knight Patented Feb. 27, 1945

2,370,444

UNITED STATES PATENT OFFICE 2,370,444

APPARATUS FOR SEPARATING SUSPENDED MATTER FROM GAS

David W. Bowman, Hollywood, Calif., assignor to Western Precipitation Corporation, Los Angeles, Calif., a corporation of California Application November 29, 1944, Serial No. 565,654

8 Claims. (Cl. 183—92)

My invention relates generally to apparatus for separating matter from a stream of gas by centrifugal action, such as dust collectors of the centrifugal type commonly known as "cyclone separators," wherein a stream of gas laden with finely divided foreign material, either liquid or solid, is subjected to a whirling motion that separates and collects the foreign particles.

My invention is more particularly concerned with apparatus for separating matter from a stream of gas by centrifugal action and having a plurality of separating units in which the gas laden with finely divided material is whirled to separate the material from the gas and provide for withdrawal of the gas and the material separately.

In the use of apparatus of this kind, it may become necessary to make repairs, or parts may become clogged, requiring disassembly. Heretofore, the separating units have not been conveniently accessible for cleaning or replacement of parts.

An object of my invention is to provide an improved centrifugal type separator in which the separating units are conveniently removable for replacement or repair.

Another object of my invention is to provide a simple and effective construction for removably securing the separating units in place.

Further objects and advantages of my invention will become apparent as the following description proceeds, and the features of novelty which characterize my invention will be pointed out with particularity in the claims annexed to and forming a part of this specification.

In the drawings:

Fig. 1 is an elevational view, partly in section, of a centrifugal type dust collector or material separator embodying my invention;

Fig. 2 is a fragmentary sectional view on the line 2—2 of Fig. 1;

Fig. 3 is a fragmentary sectional view, partly in elevation, on the line 3—3 of Fig. 2;

Fig. 4 is a fragmentary sectional view on the line 4—4 of Fig. 3, showing certain of the separating units in elevation;

Fig. 5 is a sectional view on the line 5—5 of Fig. 4, showing the manner of removably securing a group of separating units in place;

Figure 6:
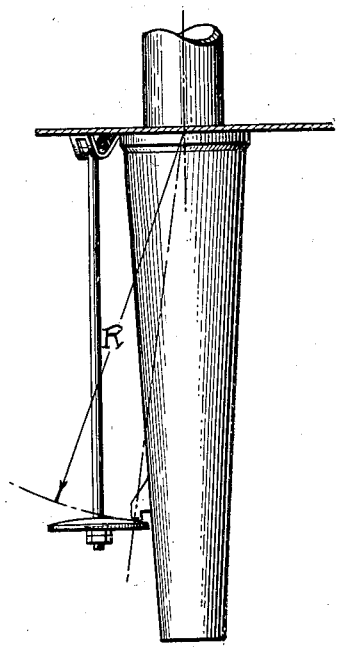
Fig. 6 is a side elevation of one of the separating units showing how the force is applied to the separating unit in securing the same in place.

Referring to the drawings, in Fig. 1 I have shown an apparatus for separating suspended matter from a stream of gas by centrifugal action, the construction being of the multiple-tube form comprising a plurality of open-ended tubular separating units 10 of generally circular cross-section and small diameter arranged vertically in a housing 11 having a top header plate 12 to which the separating units are removably secured, the axes of the separating units being substantially perpendicular to the header plate. An outlet 13 at the lower end of the housing provides for removal of the separated material discharged through the open lower ends of the separating units 10. The inclined side wall of the lower hopper-shaped portion of the housing has an opening 14 normally closed by a removable door 14a affording access to the interior of the housing for removing the separating units for the purpose of cleaning or repair.

The gas with suspended matter is supplied to the separating units through an inlet opening 15 and a header 16. This header is separated into lower and upper chambers by an inclined partition wall 17 which cuts off communication between the chambers, said chambers constituting common inlet and outlet chambers, respectively, for the several units 10. The header plate 12 is provided with openings 18 in which the separating units 10 are removably secured and through which the separating units receive the gas and suspended matter from the inlet chamber formed below the inclined partition 17. The gas and suspended matter are whirled, to subject them to centrifugal action, by a suitable directing element 19 disposed adjacent the inlet end of each unit 10, as shown in Fig. 3, and the suspended matter is separated from the gas. The separated material falls downwardly into the bottom of the housing 11. The gas is withdrawn by flowing upwardly through outlet members or tubes 20 extending into the upper ends of the separating units 10 and slidably engaging the directing elements 19. The outlet members 20 are secured to and extend through the inclined partition 17 so as to communicate with the outlet chamber formed above the inclined partition 17, the chamber having an outlet opening 21 through which the gas is discharged.

The header plate 12 is reinforced by transverse ribs 22 and spaced gussets 23, which are attached to the header plate in any suitable manner, as by welding. The remainder of the structure may be secured together by welding or in any other suitable manner. The general type of apparatus illustrated in the drawings and the mode of operation thereof, are described in greater detail in Lissman U. S. Patent 1,909,184, granted May 16, 1933.

The separating units 10 are shown as tapered uniformly throughout their length, the upper ends being provided with shoulders 24 bearing upwardly against the header plate 12 about the openings 18 and the shoulders 24 and the edges of the adjacent opening 18 constituting cooperating locating shoulder means. In order to facilitate removal of these units they are secured in place by any arrangement located outside the separating units, which is accessible, simple, and securely retains the separating units in place. This arrangement includes a tension member 25 extending longitudinally of the units, being attached at one end to the header plate 12 and having a transverse bearing member 26 attached to the other end thereof. The tension member or hanger rod 25 is attached to the header plate 12 by a stirrup 12a welded to the header plate and supporting a transverse head 12b on the hanger rod. The bearing member 26 compressively engages a curved face 27 providing a single limited area on a lug 28 welded to the separating unit, preferably adjacent the lower end thereof. In Fig. 6, the curved face 27 is shown as having a radius of curvature R about a center lying in the plane of the header plate 12 at the center of the upper end of the separating unit 10 so that the direction of the force exerted against face 27 retaining the separating unit in place intersects the axis of the separating unit at the center of the plane of the header plate 12, as clearly shown by the dotted line L. This makes the separating unit stable as the pressure is uniformly distributed about the opening 18 in the header plate, and the shoulder 24 is held tightly against the header plate throughout its circumference. Thus, all of the separating units will be securely retained in place perpendicular to the header plate. As long as the force exerted against the supporting lug 28 is directed toward the header plate and in a direction passing within the periphery of the separating unit 10 at the plane of the header plate, there will be no tendency for the force to tilt the separating unit out of vertical alignment. Consequently, the position of the center of curvature of face 27 may depart somewhat from that above described, but it should be so positioned that the radius of curvature thereof at the position of engagement by the bearing member 26 is in a direction passing within the circumference of opening 18 and shoulder 24 and preferably adjacent the center thereof.

The tension member or hanger rod 25 is threaded at its lower end and the bearing member 26 is brought into secure engagement with the lugs 28 by nuts 29. The bearing member 26 is preferably provided with an upwardly convex face 30 engaging the lugs 28 so as to exert the securing force in the desired direction against a single limited area of 27, although bearing members of other forms may be used. The number of parts required is minimized by arranging the tension members or hanger rods 25 and bearing members 26 at positions each located centrally with respect to a plurality of separating units, arranging the lugs 28 of these units so that all of them engage the bearing member 26 and secure all of the separating units by tightening the nuts 29, as shown in Fig. 5 wherein four separating units are secured in place in this manner, each separating unit being provided with but a single lug 28.

It will be observed that with supporting means arranged as above described, the force applied to the separating units in the described direction, as illustrated at L in Fig. 6 for the preferred case, has a substantial component in a direction extending outwardly with respect to the axis of the tension member 25 and perpendicular to said axis as well as to the axis of the separating unit 10. Conversely, the thrust against the transverse bearing member 26 has a substantial transverse component directed inwardly toward the axis of the tension member and perpendicular thereto. This transverse component tends to displace laterally the lower end of the tension member. If only a single separating unit were supported in this manner by each tension member, it would therefore be necessary to make the tension member of sufficiently rigid construction and to secure it rigidly to the header plate 12, or to provide suitable bearing means in order to resist this lateral thrust. However, by the arrangement shown in Fig. 5, in which a plurality of separating units are arranged symmetrically about and supported by a single tension member 25 and its associated bearing member 26, it will be seen that the lateral forces exerted against the bearing member by the several separating units are substantially completely balanced, that is, the resultant of the several components perpendicular to the axis of the tension member is substantially zero. Consequently, the tension member is subjected only to longitudinal tension, and need not be rigidly supported from the header plate 12.

The bearing members for supporting the separating units located adjacent a side wall of the housing 11 may be attached to the side wall, as shown in the left-hand portion of Fig. 3. In this construction also, the force is exerted in a direction intersecting the axis of the separating unit 10 in the plane of the header plate 12, or passing within the periphery of the separating unit at the plane of the header plate. The lugs 28 on the separating units 10 are engaged by brackets 31 attached to the wall of the housing 11 by bolting them to brackets 32 welded or otherwise suitably attached to the wall. The separating units 10 adjacent the wall of the housing 11 are thus secured in place.

As previously explained, the directing elements 19 are in sliding engagement with the outlet members or tubes 20, so that the directing elements may be removed with the separating units 10. These directing elements may be constructed in any suitable manner to impart to the gas and suspended matter entering each separating unit the desired whirling motion about the axis thereof. In the present construction they include rings 19a slidably mounted on the outlet members 20 and a plurality of helically extending vanes 19b extending outwardly from the rings and engaging the walls of the separating units, whereby the directing elements 19 are supported by engagement with the upwardly and outwardly inclined walls of the respective separating units. The outer ends of the vanes 19b are preferably shaped to conform to the tapered wall of the separating unit, so that when the directing elements are placed in the separating units they are wedged in place by engagement of the vanes with the tapered wall due to the force of gravity. I contemplate utilizing any suitable arrangement for securing the directing elements 19 in the separating units 10, and provide for removal of the directing elements with the separating units. By wedging the directing elements in place in this way they may be readily removed from the separating units. After any separating unit is separated from the corresponding outlet tube 20, the directing element 19 may be readily removed from that unit since it merely rests in engagement with the wall thereof and is free to be moved upwardly.

Figure 7:
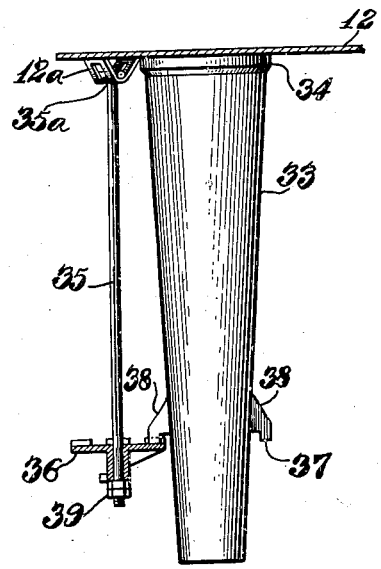
Fig. 7 is a side elevation of a separating unit showing another embodiment of the invention.
Figure 8:
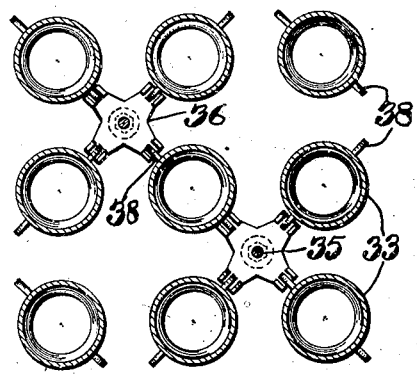
Fig. 8 is a fragmentary horizontal sectional view, similar to Fig. 5, of a group of the separating units shown in Fig. 7.

A modified embodiment of the invention is shown in Figs. 7 and 8. In this form of the invention the separating units 33 are supported with shoulders 34 bearing upwardly against header plate 12 by an arrangement similar in principle to, but somewhat different in construction from, that shown in Figs. 1 to 6. The supporting arrangement of Figs. 7 and 8 includes a tension member or hanger rod 35 extending longitudinally of the separating units and attaching to header plate 12 by stirrup 12a supporting a transverse head 35a on the hanger rod. At the lower end of the hanger rod a four-armed spider 36 is adjustably supported by nuts 39 threaded on the lower end of the hanger rod. The outer ends of the spider arms are channeled on their upper surfaces to receive and bear against the lower faces 37 of lugs 38.

Since the thrust exerted by spider 36 against each of the lugs 38 is directly upward instead of being inclined toward the axis of the tube, as in the construction of Figs. 1 to 6, it is desirable to provide two lugs on each separating tube.

While I have illustrated and described particular embodiments of my invention, I do not desire my invention to be limited thereto, and I intend in the appended claims to cover all modifications which do not depart from the spirit and scope thereof.

This application is a continuation-in-part of my application Serial No. 397,988, filed June 13, 1941.

The vane supporting arrangement of my invention is more particularly claimed in divisional application Serial No. 487,172, filed May 15, 1943.

I claim:

1. In apparatus for separating suspended matter from a stream of gas by centrifugal action and having a header plate and a plurality of separating units with their axes extending substantially perpendicular to the header plate, means for securing the units to the header plate comprising: tension members extending substantially parallel to the axes of the units and attached at one end to the header plate; and a transverse bearing member mounted on the other end of each of the tension members and bearing against a single limited area on at least one of said units to press the unit against the header plate.

2. In apparatus for separating suspended matter from a stream of gas by centrifugal action and having a header plate and a plurality of separating units with their axes substantially perpendicular to the header plate, means for securing the units to the header plate comprising: a tension member extending substantially parallel to the axes of the units and attached at one end to the header plate; and a transverse bearing member mounted on the other end of the tension member and bearing against a single limited area on each of a plurality of units in a direction toward the header plate to press the units against the header plate.

3. In apparatus for separating suspended matter from a stream of gas by centrifugal action and having a header plate and a plurality of separating units, means for supporting the units from the header plate comprising: a lug on the outside of each unit; a tension member extending parallel to the axes of the units and attached at one end to the header plate; and a transverse bearing member mounted on the other end of the tension member to bear against the lugs of a plurality of units and press the units against the header plate.

4. In apparatus for separating suspended matter from a stream of gas by centrifugal action and having a header plate and a plurality of separating units, means for supporting the units from the header plate comprising: a lug on the outside of each unit; a tension member extending parallel to the axes of the units and attached at one end to the header plate; and a transverse bearing member mounted on the other end of the tension member to bear against the lugs of a plurality of units and press the units against the header plate, the engaging surfaces on the bearing member and each lug being so disposed that the direction of pressure on each lug intersects the axis of the corresponding unit substantially at the plane of the header plate.

5. In apparatus for separating suspended matter from a stream of gas by centrifugal action and having a header plate and a plurality of separating units, means for supporting the units from the header plate comprising: a lug on the outside of each unit, the lug having an arcuate under face; a hanger rod attached at one end to the header plate; and an upwardly convex plate mounted on the other end of the hanger rod to bear upwardly against the arcuate surface of a plurality of lugs, the engaging surfaces on the plate and each lug being so disposed that the direction of pressure on the lug intersects the plane of the header plate within the periphery of the corresponding separating unit.

6. In apparatus for separating suspended matter from a stream of gas by centrifugal action and having a header plate and a plurality of separating units removably engaging said header plate and extending in one direction therefrom, means for removably securing said units to the header plate comprising: a tension member extending substantially parallel to the axes of the units and located substantially centrally with respect to the group of adjacent units and attached at one end to the header plate; and a transverse bearing member secured to the other end of the tension member and bearing against a single limited area on each of the separating units of said group and exerting a force against each such separating unit in a direction substantially intersecting the axis of that unit in the plane of the header plate.

7. In apparatus for separating suspended matter from a stream of gas by centrifugal action and having a header plate and a plurality of separating units removably engaging said header plate and having their axes substantially perpendicular to the header plate and arranged symmetrically about an axis of symmetry located substantially centrally with respect to said plurality of units, means for removably securing said units to the header plate comprising: a lug on the outside of each unit at a position removed from the header plate; a tension member located substantially along said axis of symmetry and attached at one end to the header plate; and a transverse bearing member secured to the other end of the tension member and engaging the lugs on all of said units and exerting a force against each of said lugs in a direction passing within the periphery of the corresponding unit in the plane of the header plate.

8. In apparatus for separating suspended matter from a stream of gas by centrifugal action and having an apertured header plate and a plurality of elongated tubular separating units each removably engaging said header plate at the position of an aperture in said header plate, means for removably securing said separating units to said header plate comprising: locating shoulder means on said header plate and said tubular separating units at the position of engagement thereof, said shoulder means being adapted to position said separating units against lateral displacement thereof with respect to said aperture in the plane of said header plate; attachment means comprising tension members located exteriorly of said tubular separating units and connected to said header plate, a bearing member carried by said tension members and positioned for compressive engagement with said tubular separating units at a point removed from said header plate and means for varying the position of said bearing members with respect to said header plate whereby to engage said separating unit with a supporting force directed toward said header plate.

DAVID W. BOWMAN.